US012494916B2

(12) United States Patent
Crabtree et al.

(10) Patent No.: US 12,494,916 B2
(45) Date of Patent: Dec. 9, 2025

(54) COLLABORATIVE CLOUD IDENTITY AND CREDENTIAL FORGERY AND ABUSE DEFENSE

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 210 days.

(21) Appl. No.: 18/354,658

(22) Filed: Jul. 19, 2023

(65) Prior Publication Data

US 2025/0030552 A1  Jan. 23, 2025

(51) Int. Cl.
*H04L 29/06* (2006.01)
*H04L 9/32* (2006.01)

(52) U.S. Cl.
CPC .......... *H04L 9/3236* (2013.01); *H04L 9/3213* (2013.01)

(58) Field of Classification Search
CPC ............................ H04L 9/3236; H04L 9/3213
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |
| 6,477,572 B1 | 11/2002 | Elderton et al. |
| 7,072,863 B1 | 7/2006 | Phillips et al. |
| 7,657,406 B2 | 2/2010 | Tolone et al. |
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |

(Continued)

FOREIGN PATENT DOCUMENTS

| | | | | |
|---|---|---|---|---|
| EP | 3477891 A1 | * | 5/2019 | ............... H04L 9/50 |
| WO | 2014159150 A1 | | 10/2014 | |

(Continued)

OTHER PUBLICATIONS

Nayve, Rachel Anne D., International Search Report, Nov. 4, 2024, p. 2-3.

*Primary Examiner* — Shawnchoy Rahman
(74) *Attorney, Agent, or Firm* — Galvin Patent Law LLC; Brian R. Galvin

(57) ABSTRACT

A system and method for providing a cloud identity verification exchange service which ingests a plurality of identity assertion data from various Identity Providers and/or Service Providers and aggregates the ingested plurality of data into a master global authentication ledger. The system and method comprise: a data ingestion engine configured for acquiring, extracting, and loading data into the system as well as providing hashing capabilities; a metadata manager for collecting, organizing, and cataloguing ingested data based on collected metadata; and database for storing the master global authentication ledger. The master ledger acts as a central repository that consolidates authentication objects from various Identity Providers, allowing for centralized authentication management, auditing, reporting, and analysis. It provides a comprehensive view of authentication activities across multiple systems and enables the tracking of user authentication events across different identity providers.

18 Claims, 8 Drawing Sheets

(56) References Cited

U.S. PATENT DOCUMENTS

| | | |
|---|---|---|
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,231,962 B1 | 1/2016 | Yen et al. |
| 9,294,497 B1 | 3/2016 | Ben-Or et al. |
| 9,306,965 B1 | 4/2016 | Grossman et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,762,443 B2 | 9/2017 | Dickey |
| 9,887,933 B2 | 2/2018 | Lawrence, III |
| 9,946,517 B2 | 4/2018 | Talby et al. |
| 10,061,635 B2 | 8/2018 | Ellwein |
| 10,102,480 B2 | 10/2018 | Dirac et al. |
| 10,210,246 B2 | 2/2019 | Stojanovic et al. |
| 10,210,255 B2 | 2/2019 | Crabtree et al. |
| 10,216,485 B2 | 2/2019 | Misra et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,333,705 B2 | 6/2019 | Smith et al. |
| 10,367,829 B2 | 7/2019 | Huang et al. |
| 10,511,498 B1 | 12/2019 | Narayan et al. |
| 2003/0041254 A1 | 2/2003 | Challener et al. |
| 2003/0145225 A1 | 7/2003 | Bruton et al. |
| 2004/0098610 A1 | 5/2004 | Hrastar |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2009/0012760 A1 | 1/2009 | Schunemann |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0293128 A1 | 11/2009 | Lippmann et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0266244 A1 | 10/2012 | Green et al. |
| 2013/0073062 A1 | 3/2013 | Smith et al. |
| 2013/0132149 A1 | 5/2013 | Wei et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0074826 A1 | 3/2014 | Cooper et al. |
| 2014/0156806 A1 | 6/2014 | Karpistsenko et al. |
| 2014/0244612 A1 | 8/2014 | Bhasin et al. |
| 2014/0245443 A1 | 8/2014 | Chakraborty |
| 2014/0279762 A1 | 9/2014 | Xaypanya et al. |
| 2015/0095303 A1 | 4/2015 | Sonmez et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0379424 A1 | 12/2015 | Dirac et al. |
| 2016/0004858 A1 | 1/2016 | Chen et al. |
| 2016/0028758 A1 | 1/2016 | Ellis et al. |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0140519 A1 | 5/2016 | Trepca et al. |
| 2016/0212171 A1 | 7/2016 | Senanayake et al. |
| 2016/0275123 A1 | 9/2016 | Lin et al. |
| 2016/0285732 A1 | 9/2016 | Brech et al. |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0013003 A1 | 1/2017 | Samuni et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0111175 A1* | 4/2017 | Oberhauser ............ G06F 21/33 |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0222814 A1 | 8/2017 | Oberhauser et al. |
| 2017/0250972 A1* | 8/2017 | Ronda ................... H04L 9/0891 |
| 2017/0317833 A1* | 11/2017 | Smith ................... H04L 9/3066 |
| 2017/0322959 A1 | 11/2017 | Tidwell et al. |
| 2017/0323089 A1 | 11/2017 | Duggal et al. |
| 2018/0197128 A1 | 7/2018 | Carstens et al. |
| 2018/0254907 A1* | 9/2018 | Gasparini ............ H04L 9/3255 |
| 2018/0300930 A1 | 10/2018 | Kennedy et al. |
| 2019/0082305 A1 | 3/2019 | Proctor |
| 2019/0095533 A1 | 3/2019 | Levine et al. |
| 2019/0319808 A1* | 10/2019 | Fallah ................... H04L 9/3239 |
| 2021/0352142 A1 | 11/2021 | Jayaram et al. |
| 2022/0060453 A1 | 2/2022 | Crabtree et al. |
| 2023/0118388 A1 | 4/2023 | Crabtree et al. |

FOREIGN PATENT DOCUMENTS

| | | |
|---|---|---|
| WO | 2017075543 A1 | 5/2017 |
| WO | 2022111838 A1 | 6/2022 |

\* cited by examiner

| | Identity Assertion Information | | | | |
|---|---|---|---|---|---|
| | Hash Value | Timestamp | Auth. Method | Auth. Context | Issuer |
| Identity Provider A | | | | | |
| Identity Assertion A | 2ef7bde608ce5404e | 2023-06-16-09:23:45 | SAML assertion | Mobile Login | SAML |
| Identity Assertion B | ba79232c7e2d5b6a | 2022-11-30-18:47:12 | SSO | Web Login | SSO |
| Identity Assertion C | d5f042f95f89f1c232871 | 2023-03-12-14:02:56 | Token | Mobile Login | OAuth2 |
| ... | | | | | |
| Identity Assertion N | e10adc3949ba5 | 2023-08-03-07:30:47 | JSON Web Token | Web Login | OIDC |
| Identity Provider B | | | | | |
| Identity Assertion A | 8fb6385d1e432a4459 | 2023-06-16-09:23:45 | SAML assertion | Mobile Login | SAML |
| Identity Assertion B | abbe56e057f20f883e | 2022-11-30-18:47:12 | SSO | Web Login | SSO |
| Identity Assertion C | b2a4f3030a8b4a916 | 2023-03-12-14:02:56 | Token | Mobile Login | OAuth2 |
| ... | | | | | |
| Identity Assertion N | e36c227bfc2049a16 | 2023-08-03-07:30:47 | JSON Web Token | Web Login | OIDC |

COLLABORATIVE CLOUD IDENTITY AND CREDENTIAL FORGERY AND ABUSE DEFENSE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of computer systems, and more particularly to the field of cybersecurity and threat analytics for identification, prevention, detection, response, and recovery.

Discussion of the State of the Art

A Golden SAML attack is a cybersecurity exploit that targets the Security Markup Language (SAML) authentication process used by many Single Sign-On (SSO) systems. SAML is an XML-based standard that allows organizations to exchange authentication and authorization data between different parties, typically between an identity provider (IdP) and a service provider (SP).

The Golden SAML attack is named similarly to the previously disclosed Golden Ticket attack in the Kerberos authentication protocol, as both attacks involve forging authentication materials to gain unauthorized access to systems and services and exploit some of the limitations associated with stateless authentication protocol secret management.

In a Golden SAML attack, the attack generates a forged SAML response that appears to be issued by a trusted identity provider. This fake SAML assertion can grant the attacker unauthorized access to the targeted service provider's applications and resources, and potentially enable them to impersonate other users or elevate their privileges. The steps involved in a Golden SAML attack are: 1) the attacker first gains access to the private key or signing certificate of the targeted identify provider, 2) the attacker crafts a malicious SAML response containing the desired user attributes and privileges; the response is then signed using the compromised private key or signing certificate, 3) the attacker submits the forges SAML response to the targeted service provider, 4) the service provider validates the SAML response against the public key of the identity provider; since the response is signed using the legitimate private key or signing certificate, the service provider considers it valid and authenticates the attacker, 5) the attacker has now unauthorized access to the targeted services and resources, potential with elevated privileges or impersonating other users.

Golden SAML attacks can be difficult to detect and mitigate since they exploit the trust established between identity and service providers. It's also important to note that this type of attack is not just limited to SAML, but also can apply to OAuth2. OAuth2 is an authorization framework used to enable secure and delegated access to resources on behalf of a user. While OAuth2 itself is designed to be secure, there are certain scenarios where it can be exploited to compromise a network. A few potential ways in which OAuth2 can be exploited, for example, can include phishing attacks, insecure token storage, lack of taken expiration, inadequate authorization scope, and token leakage (e.g., tokens transmitted over insecure channels or stored in logs or debug information can be intercepted by an attacker). It could be beneficial to have a repository of verified tokens issued to users which can be used for token revocation in the event of suspicious activity, enforcement of token expiration, and by forming an audit trail which can be used to monitor token usage, just to name a few examples. Fast Identify Online (FIDO) is an authentication framework that aims to provide secure and passwordless authentication. It utilizes public key cryptography to authenticate users without relying on traditional passwords. While FIDO is designed to enhance security, it is essential to understand potential exploitation scenarios. Some potential ways in which FIDO can be exploited to compromise a network include, but are not limited, physical attacks (FIDO relies on hardware-based authenticators such as USB security keys or biometric sensors. If an attacker gains physical access to these devices, they may attempt to tamper with or replace them with malicious devices), man-in-the-middle attacks, malware attacks, and weak implementation (e.g., If the FIDO implementation itself has vulnerabilities or weaknesses, such as improper key management, inadequate cryptographic protections, or flawed validation processes, an attacker may exploit these weaknesses to compromise the authentication process and gain unauthorized access).

Regardless of authentication protocol implemented, the nature of the attack exploits the inherent distance between an organization, (often outsourced) multiple identity providers, and service providers.

What is needed is a system to provide a cloud identity verification exchange service (CIVEXS) which enables verification of authentication transactions across multiple cloud identity providers, providing a single service where any Identity Provider can enroll and add a record of identity assertions. Additionally, organizations need the ability to understand the degree of identity assurance risk associated with authentication transaction auditability, enforcement and security in other organizations they interact with via the same CIVEXS capability.

SUMMARY OF THE INVENTION

Accordingly, the inventor has conceived and reduced to practice, a system and method for providing a cloud-based identity verification exchange service which ingests a plurality of identity assertion data from various Identity Providers and/or Service Providers and aggregates the ingested plurality of data into a master global authentication ledger. The system and method comprise: a data ingestion engine configured for acquiring, extracting, and loading data into the system as well as providing hashing capabilities; a metadata manager for collecting, organizing, and cataloging ingested data based on collected metadata; and database for storing the master global authentication ledger. The master ledger acts as a central repository that consolidates authentication objects from various Identity Providers and Service Providers, allowing for centralized authentication management, auditing, reporting, and analysis. It provides a comprehensive view of authentication activities across multiple systems and enables the tracking of user authentication events across different identity providers, service providers, and even organizations including advanced user and entity behavioral analysis applications that leverages currently unavailable data.

According to a preferred embodiment, a system for providing cloud identity verification is disclosed, comprising: a computing device comprising a memory, a processor and a non-volatile data storage device; a data ingestion engine comprising a first plurality of programming instructions stored in the memory which, when operating on the processor, causes the computing device to: receive a plurality of identity assertions from an identity provider; for each identity assertion of the plurality of identity assertions: assign an identification value; create a unique hash value; and store the identity assertion, the identification value, and the unique hash value in a master global authentication ledger stored on the non-volatile data storage device.

According to another preferred embodiment, a method for providing cloud identity verification is disclosed, comprising the steps of: receiving a plurality of identity assertions from an identity provider; for each identity assertion of the plurality of identity assertions: assign an identification value; create a unique hash value; and store the identity assertion, the identification value, and the unique hash value in a master global authentication ledger stored on the non-volatile data storage device.

According to an aspect of an embodiment, a metadata manager comprising a second plurality of programming instructions stored in the memory which, when operating on the processor, causes the computing device to: for each identity assertion of the plurality of identity assertions: parse the identity assertion to collect a plurality of metadata associated with the identity assertion; and store the collected metadata in the master global authentication ledger.

According to an aspect of an embodiment, the metadata comprises information related to issuer, timestamp, audience, authentication method, subject, authentication context, authentication level or assurance, attributes, digital signatures, and security tokens.

According to an aspect of an embodiment, the identification value is based on a combination of relevant attributes based on the collected metadata.

According to an aspect of an embodiment, the data ingestion engine is further configured to: obtain physical credential data from an identity verification service; link the physical credential data to the relevant identity assertion stored in the master global authentication ledger; and store the linked data in the master global authentication ledger.

According to an aspect of an embodiment, the physical credential data and the digital credential data are provided to a requesting party upon request.

According to an aspect of an embodiment, the requesting party is associated with real estate closing, bank account openings, powers of attorney, notarization, or health care actions.

According to an aspect of an embodiment, the hash value is created using a cryptograph hash function.

According to an aspect of an embodiment, the identity assertions comprise at least SAML objects, OAuth tokens, and Kerberos tickets.

According to an aspect of an embodiment, the identity assertions are associated with single sign-on systems.

BRIEF DESCRIPTION OF THE DRAWING FIGURES

FIG. 4 is a diagram illustrating a simple, exemplary master global authentication ledger, according to an aspect.

DETAILED DESCRIPTION OF THE INVENTION

Figure 1:
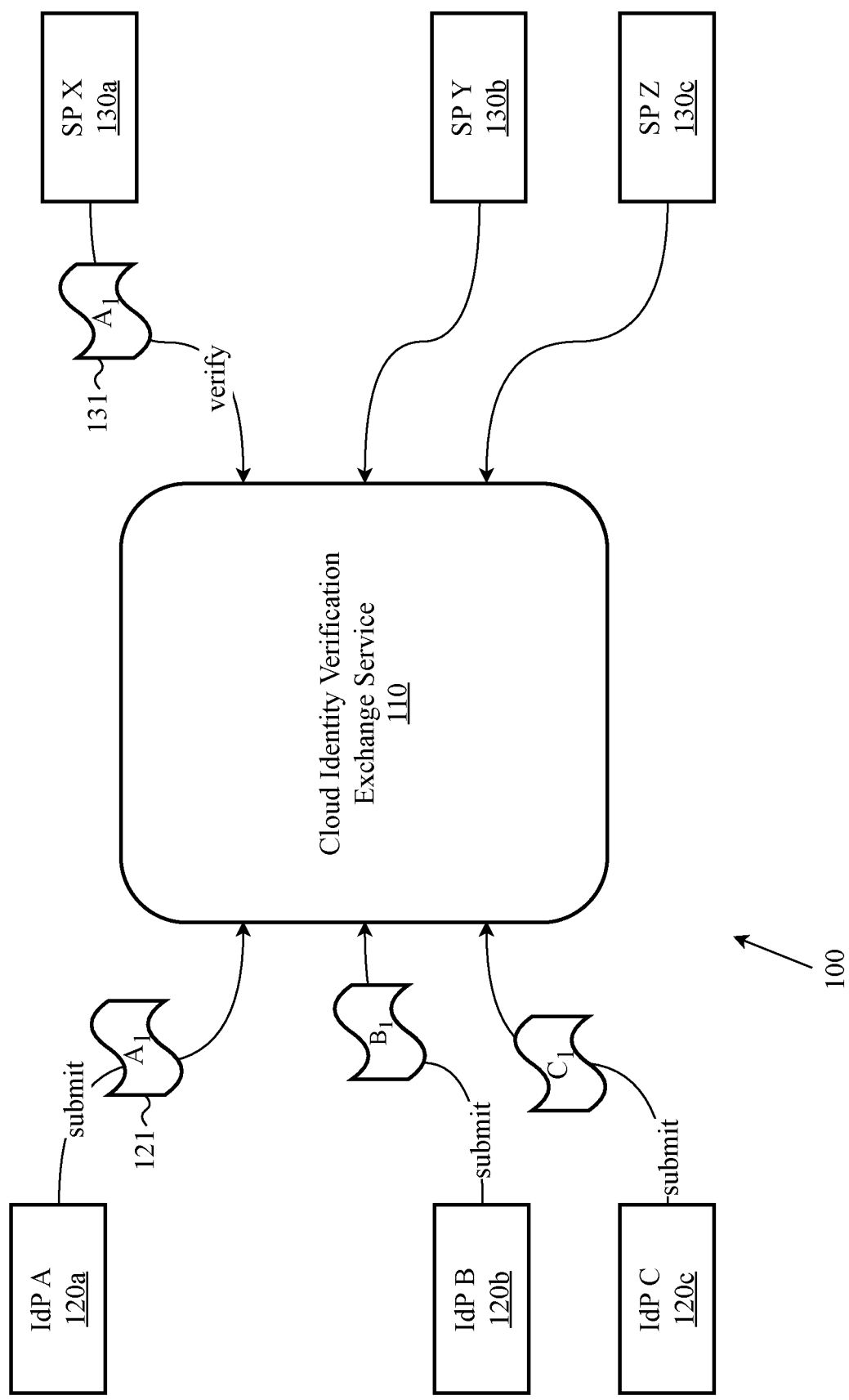
FIG. 1 is a block diagram illustrating an exemplary system architecture for a Cloud Identity Verification Exchange Service (CIVEXS), according to an embodiment.

The inventor has conceived, and reduced to practice, a system and method for providing a cloud identity verification exchange service which ingests a plurality of identity assertion data from various Identity Providers and/or Service Providers and aggregates the ingested plurality of data into a master global authentication ledger. The system and method comprise: a data ingestion engine configured for acquiring, extracting, and loading data into the system as well as providing hashing capabilities; a metadata manager for collecting, organizing, and cataloguing ingested data based on collected metadata; and database for storing the master global authentication ledger. The master ledger acts as a central repository that consolidates authentication objects from various Identity Providers, allowing for centralized authentication management, auditing, reporting, and analysis. It provides a comprehensive view of authentication activities across multiple systems and enables the tracking of user authentication events across different identity providers.

Cloud Identity Verification Exchange Service (CIVEXS) is a method to address the gaps in stakeholders just as the Real ID Act of 2005 established more stringent requirements for driver licenses and identification cards issued by U.S. states and territories to access certain resources such as federal buildings and boarding airlines using a common central database (really federated S2S services but simplistically a central DB). Before the implementation of the Real ID Act, individual states and territories had autonomy in establishing their own regulations concerning the issuance of identification cards. These regulations encompassed requirements for the necessary documentation, the information displayed on the card, and the inclusion of security measures. The requirements for cloud identity verification today are not much different than that of identification cards prior to the Real ID Act. One of the provisions in the Real ID Act was the directed use of a State-to State (S2S) Verification Service. "State-to-State (S2S) Verification Service is a means for a state to electronically check with all other participating states to determine if the applicant currently holds a driver license or identification card in another state. The platform that supports S2S, the State Pointer Exchange Services (SPEXS) was successfully implemented in July 2015."

Similarly, a Cloud Identity Verification Exchange Service (CIVEXS) is necessary to provide global verification services for the various cloud Identity Providers such as Azure, Okta, Ping and others. CIVEXS would provide a single service where any identity provider could enroll and add a record of identity assertions and tokens validity issued. In some implementations, the system may use simple RESTful APIs (other API and data exchange methods may also be used) where every time an IdP issues a new proof of identity a record is added to the CIVEXS in the form of an ID and a unique hash similar to what is already included in SAML objects and OAuth tokens. CIVEXS would also provide a companion set of API endpoints for Service Providers (SPs) and security products to check any identity objects against a global master authentication ledger. In short, CIVEXS would be implemented as a global service to provide ledger-based detections for all IdPs and SPs on an opt-in basis in the same way QOMPLX already implemented detection for Kerberos forgeries and Golden SAML attacks. A global master authentication ledger would ensure that any forgeries were detected regardless of which IdP or SP is used as long as they opt-in to CIVEXS.

One unique aspect of the CIVEXS system is that it can support both inter- and intra-authentication validation. In the single organization case, pending on premise security from Kerberos, successful NTLM retirement or sufficiently "low authentication toxicity", and sufficient IdP and SP integration for SAML and Oauth2, then the organization can gain "trusted authentication status" based on its achievement of high observability and low toxicity and no evidence of authentication attacks during a covered period. For example, evidence of observation and no evidence of attack-mitigating the difference between absence of evidence and evidence of absence in concert. In the "inter" organizational case, think file sharing use cases (e.g., Box, Dropbox, MSFT Drive, GDrive, etc., as well as data room providers e.g., for M&A actions or data warehouses like Snowflake) if multiple organizations have "trusted" authentication enforcement and publish sufficient chain of custody for credentials and access information to CIVEX then "clearing" authentication and data access is possible inside the CIVEX platform. This would allow for third party "verification" of end-to-end authentication when access is granted for both intra and inter organizational access sharing. The "opt-in" for CIVEX can then include different levels of NTLM, Kerberos and SAML/Oauth2 and toxicity score tracking and availability to include the ability for organizations to specify conditions under which such data might be accessed. Participating organizations and users may select from various levels of visibility for their authentication percentage score and toxicity score, and process specific or user specific levels of trust. For example, if User A shares a document with User B via a file sharing application, can User A can be sure that it is in fact User B accessing the share document using a mix of CIVEX and a secondary identify verification provider, for example Id.me.

Additionally, specific authentication transaction audits might be preserved and available upon request e.g., from within an information sharing group like the U.S. Government's Intelligence Community, the MS-ISAC, or a banking entity like FS-ISAC or DTCC who could operate CIVEXs on behalf of a shared community with appropriate safeguards for data security, competition/anti-trust, etc.

It should be noted that SPEXS and digital identity verification services like ID.me which match a person and a set of identity credentials (e.g. a passport or driver's license meeting RealID standards and available through SPEXS) differ from CIVEXS role-most notably in that the "credentials" or "identity" construct within the computing environment ultimately relies on the issuance of a SSO ticket or token which is analogous to the original state issuing a driver's license or the State Department issuing a passport. Note that one preferred embodiment of the disclosed invention is linking SPEXS or ID.me or other identity verification services to a CIVEXS service infrastructure (similarly the classified networks like the OPM database or intel community's Scattered Castles) could operate their own combined SPEXS+CIVEXS like common validation services (e.g., across all intelligence community members on Secret, Top Secret, or other similar isolated network enclaves).

Since banking, financial transactions, legal documents, etc., increasingly rely on attestation of a user and the link of their digital and physical credentials, there exist numerous applications where government and private entities should expect and indeed demand that a combined SPEX+CIVEXS capability is able to clear authentication events at the "human credential" and "computing credential" levels. Common use cases would be for real estate closing, bank account openings, powers of attorney, notarization (e.g., digital and remote notaries when combined with services like notarize.com), health care actions/approvals, etc. This can also be used to improve money laundering and anti-terrorism elements with automated clearing house networks, society for worldwide interbank financial telecommunication network, etc., by linking CIVEXS and SPEXS (or alternative substitute) audit information/metadata to the transaction in traditional databases or immutable ledgers.

Financial transactions utilize Society for Worldwide Interbank Financial Telecommunication (SWIFT), which provides a messaging network and communication protocol widely used in the financial industry for secure and standardized communication between financial institutions. It facilitates the exchange of financial transactions, instructions, and other messages related to banking and financial services globally. SWIFT messages are transmitted using secure channels and are protected through various security measures, including encryption, digital signatures, and strong access controls. This helps ensure the confidentiality and integrity of the transmitted information. In some implementations, CIVEXS may integrate with or otherwise link a system for SWIFT protocol validation in order to provide enhanced transactional security and assurance. As an example, U.S. U.S. Pat. No. 10,432,660 provides a system for SWIFT protocol validation, among other things, which may be integrated with CIVEXS.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As referred to herein an "identity assertion" or "authentication assertion" is information about a Service Provider's current user that is sent from an Identity Provider to the Service Provider for the purpose of making access decisions and/or personalizing the user's experience with the service.

Conceptual Architecture

FIG. 1 is a block diagram illustrating an exemplary system architecture 100 for a Cloud Identity Verification Exchange Service (CIVEXS) 110, according to an embodiment. According to the embodiment, the system comprises a CIVEXS 110 configured to operate as a centralized platform for identity verification and serving as a trusted infrastructure for the global cloud identity industry. The platform can provide a standardized and streamlined approach, promoting transparency, security, and efficiency in its operation. CIVEXS 110 can settle and verify identity assertions and tokens validly issued by various cloud Identity Providers (IdPs) 120a-n, providing a single service where any IdP could enroll and add a record 121 of identity assertions. By providing a global master authentication ledger, CIVEXS 110 can ensure the integrity of identity verification across multiple IdPs and Service Providers (SPs) 130a-n (e.g., Azure, Okta, Ping, etc.). According to an aspect, CIVEXS 110 provides a means for an IdP to check with all other participating IdPs to determine if a user currently holds an associated valid authentication assertion or object.

In the context of authentication and authorization, particularly in relation to SAML and OAuth2, and Identity Provider and Service Provider serve distinct roles. The IdP is responsible for managing user identities and authenticating users. It maintains a database of user accounts, credentials, and, in some cases, their associated roles and permissions. When a user attempts to access a protected resource or application, the IdP verifies their identity by asking them to provide their credentials (e.g., username and password, or using multi-factor authentication). Once the user is authenticated, the IdP issues a security token, such as a SAML assertion or an OAuth2 token, which includes information (e.g., metadata) about the user's identity, and, potentially, their roles or permissions. The IdP is a trusted source of user identity information for one or more service providers. In a federated identity system, the IdP allows users to use a single set of credentials to authenticate with multiple Service Providers, enabling Single Sign-On.

The Service Provider 130a-n refers to the application or resource that relies on the IdP for the user authentication and authorization. It can be a web application, API, or any other service that requires users to be authenticated before accessing its resources. When a user attempts to access the protected resource, the SP redirects the user to the associated IdP for authentication. After the user is authenticated by the IdP, the SP receives the security token (e.g., SAML assertion, OAuth 2 token, etc.) containing the user's identity information and, in some cases, roles and permissions. The SP checks the security token to ensure it was not modified and that it was issued by an IdP certificate that it previously established trust with. The SP then checks the user's roles or permissions to determine whether the user is authorized to access the requested resource. If the security token passes the checks and the user is authorized, the SP grants the user access to the requested resource or application.

In short, the Identity Provider is responsible for managing and authenticating user identities, while the Service Provider relies on the Identity Provider to authenticate users before granting them access to its resources.

In some embodiments, Service Providers 130a-n can provide a record 131 of identity verifications to CIVEXS 110 wherein it may be combined or aggregated into the global master authentication ledger, thereby providing a record of valid authentication objects and identity verifications which can be viewed by any participating (e.g., registered, subscribed, etc.) IdP or SP.

In various embodiments, a master global authentication ledger of authentication objects (e.g., SAML assertions, OAuth2 tokens, etc.) from various IdPs 120a-n can comprise a centralized record or repository that stores information related to authentication events and objects from multiple providers. The specific contents of the ledger can vary depending on the requirements and design of the embodiment, but some common elements can include (but is not limited to), Identity Provider information, user identity information, authentication timestamp, authentication method, authentication result, authentication context, security and audit information, and/or the like.

According to various embodiments, identity assertions may comprise SAML objects, OAuth tokens, Kerberos tickets, or some combination thereof. In some embodiments, identity assertions may comprise data associated with NT Lan Manager (NTLM) authentication protocol.

According to an aspect, each authentication object in the ledger can include details about the Identity Provider that performed the authentication. This could include the identity provider's name, unique identifier, metadata, or any other relevant information that helps identify the source of the authentication.

According to an aspect, the ledger can include information about the user whose authentication was performed. This could include the user's unique identifier, username, email address, or other user attributes associated with their identity.

According to an aspect, the ledger can record the timestamp or time at which the authentication event occurred. This helps establish the temporal context of the authentication and can be useful for auditing, compliance, or investigating security incidents.

According to an aspect, the ledger can capture information about the authentication method or mechanism used during the authentication process. This could include details about the type of authentication, such as username/password, multi-factor authentication, biometric authentication, or token-based authentication.

According to an aspect, the ledger can store the outcome or result of the authentication event, indicating whether it was successful, failed, or had any other status. This information can help determine the validity of the authentication and the subsequent actions to be taken based on the result.

According to an aspect, the ledger may include contextual information about the authentication, such as the client device or application used, the IP address or network location from which the authentication request originated, or any other relevant details that provide insights into the authentication context.

According to an aspect, the ledger may store additional security-related information, such as cryptographic signatures or hashes to ensure the integrity and authenticity of the authentication objects. It may also record audit logs or logs of any relevant security events associated with the authentication process.

According to an aspect, the ledger can accommodate additional metadata or custom attributes associated with each authentication object. This can include information specific to the identity provider, the user, or any other relevant details required by the system or application utilizing the ledger.

To implement the global master authentication ledger a data storage system that provides features such as data integrity, scalability, and efficient querying may be suitable. A few examples of data storage systems that may be utilized in various embodiments can include, but are not limited to, relational database management systems (e.g., MySQL, PostgreSQL, Oracle Database, etc.), NoSQL databases (e.g., MongoDB, Apache Cassandra, Amazon DynamoDB, etc.), distributed ledger technologies or blockchain (e.g., Ethereum, Hyperledger Fabric, Corda, etc.), append-only logs (e.g., Apache Kafka, Apache Pulsar, NATS Streaming, etc.), time series databases, vector databases, and/or any other suitable data storage system known to those with skill in the art.

In a preferred embodiment, in operation, various IdPs and SPs can choose to partake of the service and in doing so, they agree to provide a record of identity assertions to CIVEXS 110. CIVEXS 110 receives various records of identity assertions from the various IdPs and SPs and creates a global master authentication ledger. The global master authentication ledger may be accessed and viewed by any of the participating entities (e.g., IdPs, SPs, auditors, regulators, etc.) via CIVEXS 110, which can provide a user interface for uploading identity assertion records, accessing and viewing data, and receiving and responding to alerts, if applicable.

Figure 2:
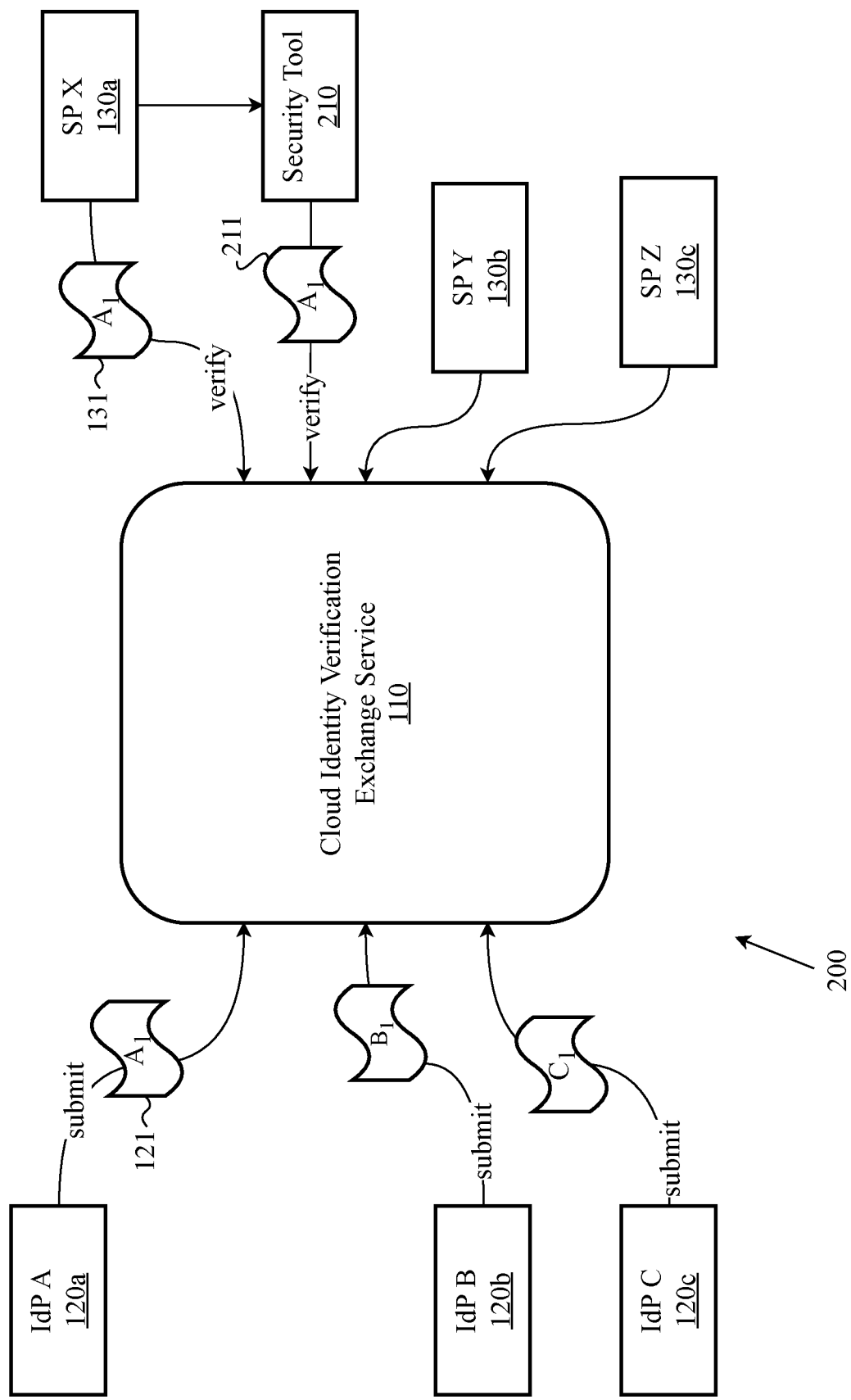
FIG. 2 is a block diagram illustrating an exemplary system architecture for a Cloud Identity Verification Exchange Service (CIVEXS) utilizing an integrated security tool, according to an embodiment.

FIG. 2 is a block diagram illustrating an exemplary system architecture 200 for a Cloud Identity Verification Exchange Service (CIVEXS) utilizing an integrated security tool 210, according to an embodiment. Additionally, or alternatively, verification can be passed to a security tool 210 for alerting rather than through a SP for inline processing, according to the embodiment. Security tool 210 may be configured to provide monitoring and log analysis, intrusion detection and prevention, vulnerability scanning, authentication and access control, malware detection and prevention, security event monitoring and alerting, security information and event management, and/or threat intelligence integration. In some implementations, system 200 may be integrated with a system configured to aggregate a large plurality of authentication objects from various IdPs 120a-n into an authentication object database. Authentication object database may be used to support a Zero-Trust model for a network security architecture by providing a stateful and immutable record of verified authentication objects from the source that created the object, thereby facilitating autonomous and persistent identity assurance as a user interacts with the network. A record of verifications 211 processed by security tool 210 may be sent CIVEXS 110 and aggregated into a global master authentication ledger.

Figure 3:
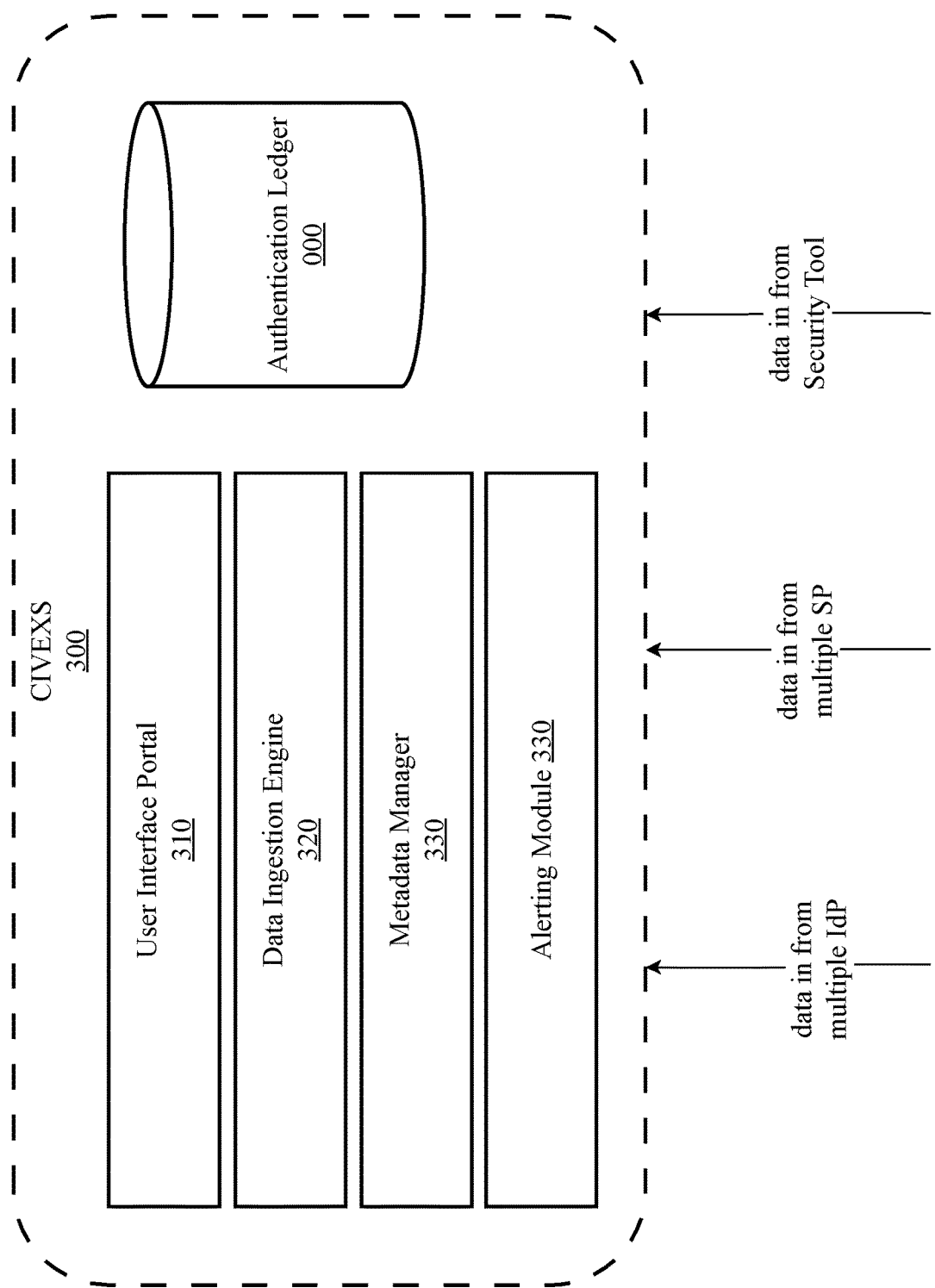
FIG. 3 is a block diagram illustrating an exemplary aspect of an embodiment of a cloud identity verification exchange service.

FIG. 3 is a block diagram illustrating an exemplary aspect of an embodiment of a cloud identity verification exchange service 300.

According to the embodiment, a user interface (UI) portal 310 is present and configured to provide authorized jurisdictional Cloud Identity Verification Exchange Service 300 users to access CIVEXS data, reports, and alerts. These reports/alerts help users monitor data quality and timeliness of various aspects of their operations, including compromised authentication credentials and failed authentications. In some implementations, UI portal 310 may be implemented as a web application accessible via the Internet. In some embodiments, UI portal 310 may be implemented as a software application stored and operable on a computing device. A web application UI may be implemented using web technologies such as HTML, CSS, and JavaScript and configured to run inside a web browser and can be accessed across different platforms and devices without the need for platform-specific development.

Data ingestion engine 320 is responsible for the actual process of acquiring, extracting, and loading data into CIVEXS 300. It can be configured to perform tasks such as data extraction, transformation, and loading (ETL). Data ingestion engine 320 is capable of handling different data formats (e.g., comma separated variable, JSON, XML, etc.) and structures, and it may implement techniques like parsing, schema inference, or schema-on-read. Data ingestion engine 320 may utilize various mechanisms for handling error conditions, retries, and resiliency.

In some implementations, data ingestion engine 320 may utilize one or more data connectors to facilitate data exchange. The data connectors may act as bridges between the data sources (i.e., IdPs, SPs, etc.) and data ingestion engine 320. The data connectors provide the necessary interfaces or protocols to connect with specific data sources, allowing data ingestion engine 320 to extract data efficiently. Data connectors can be in the form of drivers, connectors, adapters, or application programming interfaces (APIs) specific to each data source type, enabling seamless data extraction and transfer. In some implementations, a method involving APIs may be implemented to obtain a record of identity assertions and tokens validly issued. The API may be a RESTful API adhering to the REST standard of API operation where every time an IdP issues a new proof of identity a record is added to CIVEXS database 340. In some embodiments, the record is in the form of an ID and a unique hash similar to what is already included in SAML objects and OAuth tokens. Likewise, CIVEXS 300 can provide a companion set of API endpoints for SP and security products to check any identity objects against a global master authentication ledger. In an embodiment, CIVEXS 300 may be implemented as a global service to provide ledger-based detections for all IdPs and SPs on an opt-in basis. A global master authentication ledger would ensure that any forgeries were detected regardless of which IdP or SP is used as long as they opt-in to CIVEXS 300.

Data ingestion engine 320 may utilize data transformation tools to convert and map data from the source format to a common or target format. These tools can provide functionality for data cleansing, normalization, aggregation, enrichment, or schema mapping. Transformation tools enable the data to be harmonized and aligned to a unified structure suitable for further processing and analysis. In addition, data ingestion engine 320 may comprise data quality and validation components configured to ensure that the ingested data is accurate, consistent, and meets the required standards. These components can involve data profiling tools to assess data quality, identify anomalies, and perform statistical analysis. Data validation mechanisms can include data type validation, schema validation, duplicate detection, and data integrity checks. These components help in identifying and resolving data quality issues during the ingestion process. In some implementations, data ingestion engine may not perform any data transformations on the data, and subsequently store the data in its raw format in a data storage system.

According to some embodiments, data ingestion engine 320 may implement one or more data processing frameworks for distributed data processing, parallel execution, and efficient resource utilization. For example, frameworks known by those with skill in the art such as Apache Spark, Apache Fink, of Hadoop MapReduce provide scalable and fault-tolerant processing capabilities. These frameworks enable data transformation, aggregation, filtering, and complex analytics on the ingested data. Such frameworks leverage distributed computing paradigms to handle large-scale data processing efficiently.

In some implementations, data ingestion engine 320 may be configured to create an identification (ID) value or a hash value or both, for each identity assertion included in the uploaded record of identity assertions. There are several methods for creating unique hash values which may be implemented depending upon the aspect of the embodiment. For example, cryptographic hash functions (e.g., SHA-256), message authentication code, and/or universally unique identifier. In a preferred embodiment, a cryptographic hash function is used to produce unique hash values and offer properties such as collision resistance and data integrity.

According to some embodiments, data ingestion engine 320 may be configured to perform data vectorization on all or a subset of ingested data. Vectorized data may be stored in a vector database. For example, the interactions between and among IdPs, SPs, Users, and Service Accounts may be vectorized and used as inputs into a machine learning/artificial intelligence model for classification and anomaly detection. Machine learning algorithms can be trained on labeled authentication data to classify authentication attempts into different categories. Training such a classifier may begin collecting a labeled dataset where each authentication attempt is associated with a known outcome (e.g., successful or failed authentication, specific user roles, etc.). The vectorized authentication information serves as the input features, and the corresponding labels are the target variables. Next, extracting relevant features from the vectorized authentication information that capture patterns and characteristics useful for classification. This could include attributes such as user identifiers, timestamps, IP addresses, device information, or any other relevant data. Selecting an appropriate classification algorithm (e.g., logistic regression, decision trees, random forests, or neural networks) and training it on the labeled dataset. The algorithm learns the patterns and relationships between the authentication features and the associated labels.

Machine learning/artificial intelligence can also be utilized for anomaly detection by identifying unusual or suspicious authentication attempts. This may be implemented by collecting an unlabeled dataset consisting of vectorized authentication information without explicit labels. This dataset should include a variety of normal authentication patterns. Next, using unsupervised learning techniques like clustering (e.g., k-means, DBSCAN) or outlier detection algorithms (e.g., Isolation Forest, Local Outlier Factor) to train a model on the unlabeled dataset. These algorithms identify patterns within the authentication data and detect deviations from those patterns. A next step includes determining a threshold or score that defines what constitutes an anomaly. This can be done by analyzing the distribution of scores or distances obtained from the model. Points that fall beyond the threshold are considered anomalous. Then applying the trained model to new authentication attempts.

If an authentication attempt's vectorized information deviates significantly from normal patterns, it can be flagged as an anomaly or suspicious activity.

Data ingestion engine 320 may be configured to implement one or more various vectorization schemes, dependent upon the embodiment. Some exemplary vectorization schemes can include, but are not limited to, one-hot encoding, word embeddings, and numerical feature scaling. Prior to vectorization, data may be preprocessed, and relevant features extracted from the data that capture the essential characteristics for vectorization. The features extracted depend on the data type and the vectorization technique being used. For example, for text data, you may extract features like word frequency, term frequency-inverse document frequency (TF-IDF) scores, or word embeddings. For numerical data, the features may be the raw values themselves or derived statistics like mean, standard deviation, or percentiles.

When vectorizing authentication information between an Identity Provider (IdP) and a Service Provider (SP), a suitable technique would involve representing the authentication information as a compact and standardized vector format. One common approach is to use JSON Web Tokens (JWTs) as the vectorization technique. JWT is a compact and self-contained format for transmitting information between parties as a JSON object. It consists of three parts: a header, a payload, and a signature. The header contains metadata about the JWT, such as the token type and the cryptographic algorithms used for signing the token. For authentication purposes, the "typ" field can be set to "JWT." and the "alg" field can specify the algorithm used for signing, such as HMAC or RSA. The payload contains the actual authentication information in the form of key-value pairs. It can include information like user identifiers, authentication timestamps, user roles, or any other relevant data. Include the necessary information required for authentication and authorization between the IdP and SP. The signature is created by digitally signing the concatenated header and payload using a shared secret key or a public-private key pair. This signature ensures the integrity and authenticity of the token. The signature is included as the third part of the JWT. The IdP can generate the JWT after successfully authenticating the user. It can then transmit the JWT to the SP as part of the authentication process. The SP verifies the authenticity of the JWT by checking the signature using the shared secret key or the public key associated with the IdP. Vectorized data may be stored in a suitable data structure such as, for example, arrays, matrices, or more specialized data structures like parse matrices for high-dimensional and sparse data.

According to the embodiment, CIVEXS 300 may comprise a metadata manager 330 configured to organize and catalogue the ingested data. It provides information about the data's structure, source, semantics, relationships, and other relevant attributes. Metadata manager 330 assists in data discovery, understanding data lineage, and maintaining governance. Metadata manager 330 can enable efficient search, indexing, and retrieval by providing a centralized repository for storing and managing metadata information. As it relates to authentication or identity assertions, metadata can provide additional information about the authentication process, the user, or the authentication context. Collected metadata may be stored in the global master authentication ledger, according to an embodiment.

Some examples of metadata that can be associated with authentication assertions can include, but are not limited to, issuer (indicates the entity that issued the authentication assertion e.g., IdP, authentication service, or trusted authority, etc.), timestamp (indicates when the authentication assertion was issued, helps to establish validity period of the assertion and provides a reference for evaluating its freshness), audience (e.g., intended recipient), authentication method (describes specific authentication mechanism used to authenticate the user, e.g., username/password, multi-factor authentication, biometric authentication, or token-based, etc.), subject (identifies the authenticated user or the principal associated with the authentication assertion and can include details like the user's unique identifier, username, email address, or any other relevant identity information), authentication context (information about the context in which the authentication took place and can include details like the client device or application used for authentication, the network location, or the user's IP address), authentication level or assurance (denotes the level of confidence or assurance associated with the authentication process and can be expressed as a numeric value or a descriptive categorization, indicating the strength of the authentication method employed), attributes (additional attributes or claims associated with the user can be included as metadata in the authentication assertion and can provide extra information about the user, such as their role, group membership, access privileges, or other custom user attributes), digital signatures (metadata related to digital signatures can be included to ensure the integrity and authenticity of the authentication assertion and may include information about the signing algorithm, the digital certificate used, or the signature expiration), and security tokens (in some cases, authentication assertions may be encapsulated in security tokens, such as SAML tokens or JSON Web Tokens (JWT); these tokens can include metadata like token expiration, token issuer, token audience, or token-specific claims). These are just a few examples of metadata that may be associated with authentication assertions. The specific metadata included may vary depending upon the authentication protocol, standards, and requirements of the system or service being used (e.g., enrolled Identity Provider or Service Provider, etc.)

Data ingested by CIVEXS 300 may be stored in one or more databases 340. Ingested data associated with identity assertions and tokens issued by various cloud IdPs may be stored in an authentication ledger 340 configured to store a plurality of identity assertion records from various cloud IdPs. According to various embodiments. CIVEXS 300 employs scalable storage systems to store and manage large volumes of ingested data. For example, distributed file systems like Hadoop Distributed File System provide fault tolerance, high throughput, and scalability. Cloud-based storage solutions such as Amazon S3, Google Cloud Storage, or Azure Blob Storage offer scalable and durable options that may be implemented in some embodiments of CIVEXS 300. Exemplary distributed databases like Apache Cassandra or Apache HBase are designed to handle massive amounts of data across multiple nodes, ensuring scalability and high availability. Data storage systems utilized in various embodiments of CIVEXS 300 can include, but are not limited to, relational databases, NoSQL databases, distributed file systems, object storage systems, columnar databases, graph databases, time series databases, and vector databases, to name a few.

Detailed Description of Exemplary Aspects

FIG. 4 is a diagram illustrating a simple, exemplary master global authentication ledger 400, according to an aspect. According to the aspect, authentication ledger 400 acts as a central repository that consolidates authentication objects from various identity providers, allowing for centralized authentication management, auditing, reporting, and analysis. It provides a comprehensive view of authentication activities across multiple systems and enables the tracking of user authentication events across different identity providers. As shown in the illustration, the ledger may comprise a plurality of identity assertions from a plurality of Identity Providers. The plurality of identity assertions may be obtained directly from IdPs and SPs via user interface portal 310 which provides a gateway for IdPs and SPs to upload records of authentication (e.g., identity) assertions. Each of the stored identity assertions may be assigned an ID and/or a unique hash value which can serve as a reference for retrieving or verifying data integrity of an identity assertion. In some implementations, the ledger may further comprise various information associated with a particular identity assertion. This information may be gathered during the data ingestion process by data ingestion engine 320 and/or by metadata manager 330. As illustrated, identity assertion information such as issuer data, timestamps, authentication methods, authentication context (e.g., device used to login, etc.), and recipient data. This illustration serves as a simple example of an authentication ledger and is in no way limiting with respect to the information contained therein or the structure of said example.

Figure 5:
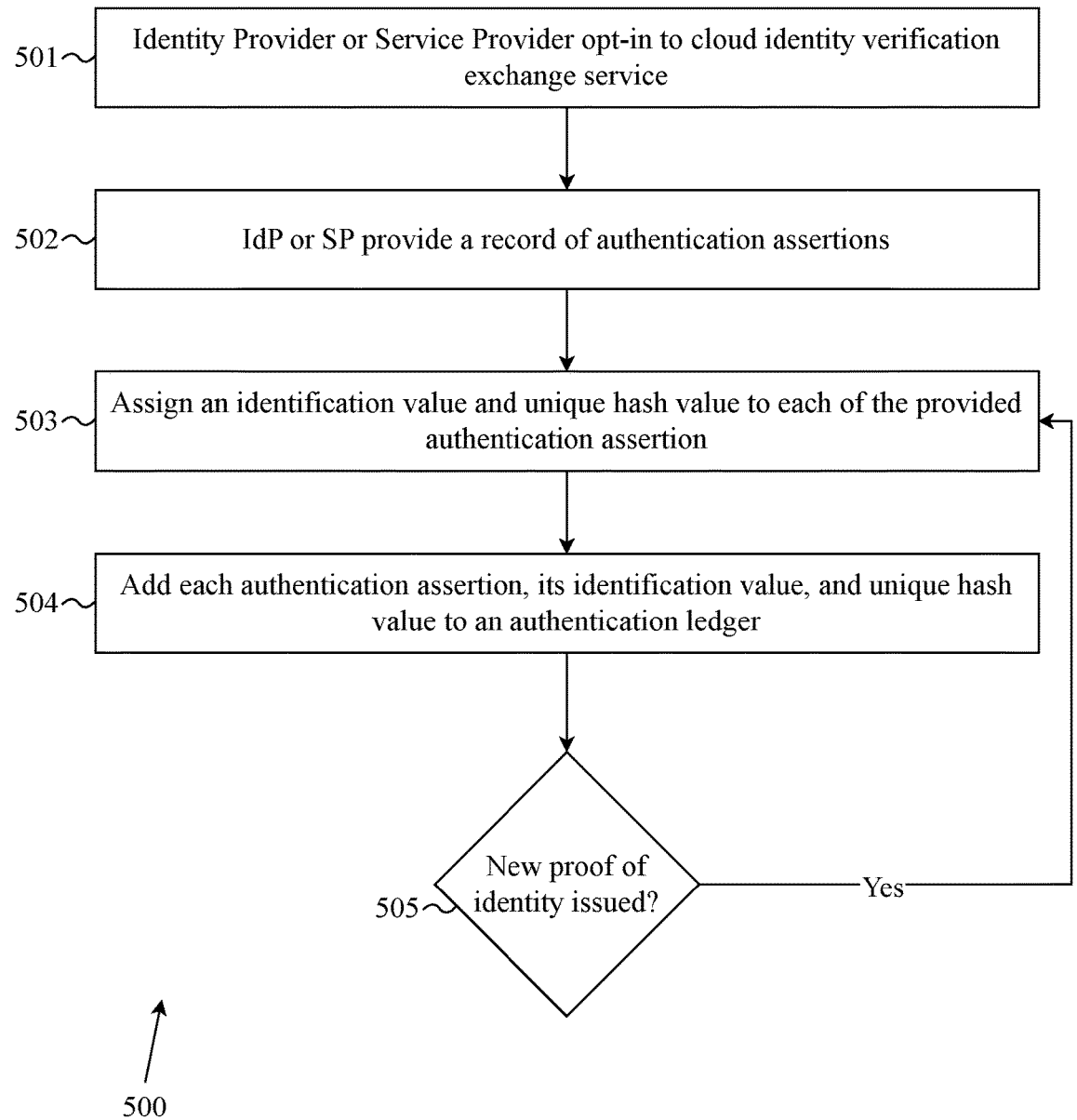
FIG. 5 is a process flow diagram illustrating an exemplary method for creating a master global authentication ledger, according to an aspect.

FIG. 5 is a process flow diagram illustrating an exemplary method 500 for creating a master global authentication ledger, according to an aspect. According to the aspect, the process begins at step 501 when an Identity Provider and/or a Service Provider opt-in to the Cloud Identity Verification Exchange Service. The opt-in may be in the form of a subscription or license to CIVEXS. At opt-in, a IdP or SP may be instructed to create an account which can provide them access to CIVEXS. At step 502, the IdP and/or SP provide a record of authentication assertions to CIVEXS. At step 503, data ingestion engine 320 obtains the record of authentication assertions and assigns an identification value and unique hash value to each of the provided authentication assertions. In some implementations, a cryptographic hash function may be utilized to create unique hash values for each obtained authentication assertions. At step 504, data ingestion engine 320 may then add each authentication assertion, its ID, and its unique hash value to a master global authentication ledger. The ledger may be accessed and viewed by IdP and SPs which have opted-in. At step 505, CIVEXS 300 operates in standby mode unit until a new proof of identity is issued by an IdP, at which point the process goes back to step 503 wherein the new proof of identity is assigned an ID and hash value before being stored in the master global ledger.

Figure 6:
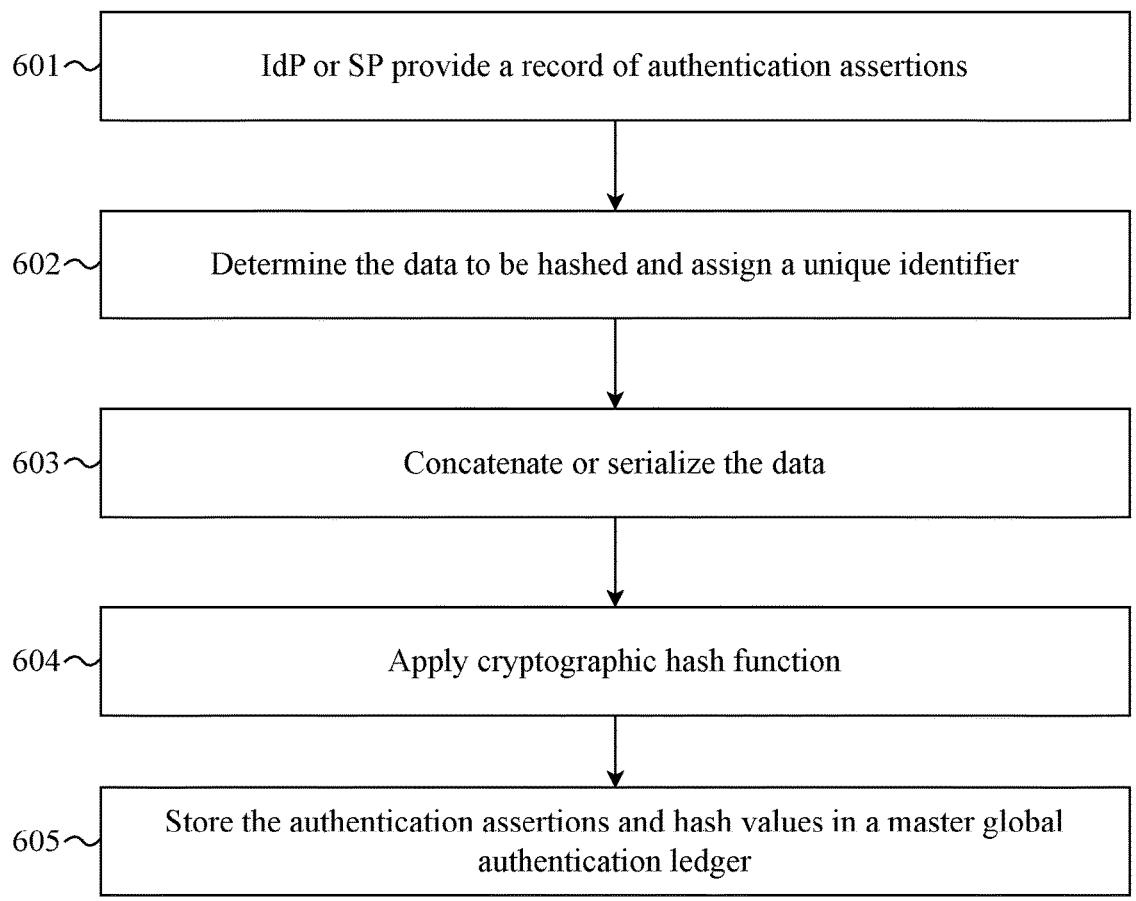
FIG. 6 is a process flow diagram illustrating an exemplary method for assigning an ID and unique hash value to an ingested identity assertion, according to an aspect.

FIG. 6 is a process flow diagram illustrating an exemplary method 600 for assigning an ID and unique hash value to an ingested identity assertion, according to an aspect. According to the aspect, the process begins at step 601 when CIVEXS obtains a record of authentication (i.e., identity) assertions provided by an IdP or SP. At step 602, data ingestion engine 320 may determine the data to be hashed and assign unique identifier. Data ingestion engine 320 can identify the received authentication assertion and assign a unique identifier, such as a record ID or a combination of relevant attributes. The combination of relevant attributes may be based on collected metadata associated with the authentication assertion. Data ingestion engine 320 may then, at step 603, concatenate or serialize the data into a standardized format, ensuring that the order and representation of the information are consistent. This may be achieved by concatenating the values into a single string or serializing the data into a specific format, such as JSON or XML. At step 604, data ingestion engine 320 can apply a cryptographic hash function to create a unique hash value for each ingested authentication assertion. A cryptographic hash function (e.g., SHA-356 or SHA-3, etc.) is applied to the concatenated or serialized data. The hash function will process the input and produce a fixed-length hash value. Using a cryptographic hash functions provides assurance that the different inputs (e.g., identity assertions) will produce unique hash values, ensuring integrity and uniqueness of the aggregated identity assertions. At a last step 605, data ingestion engine 320 can store the authentication assertion, its hash value, ID, and other metadata in the master global authentication ledger. In some implementations, only the hash value is stored in the authentication ledger.

Figure 7:
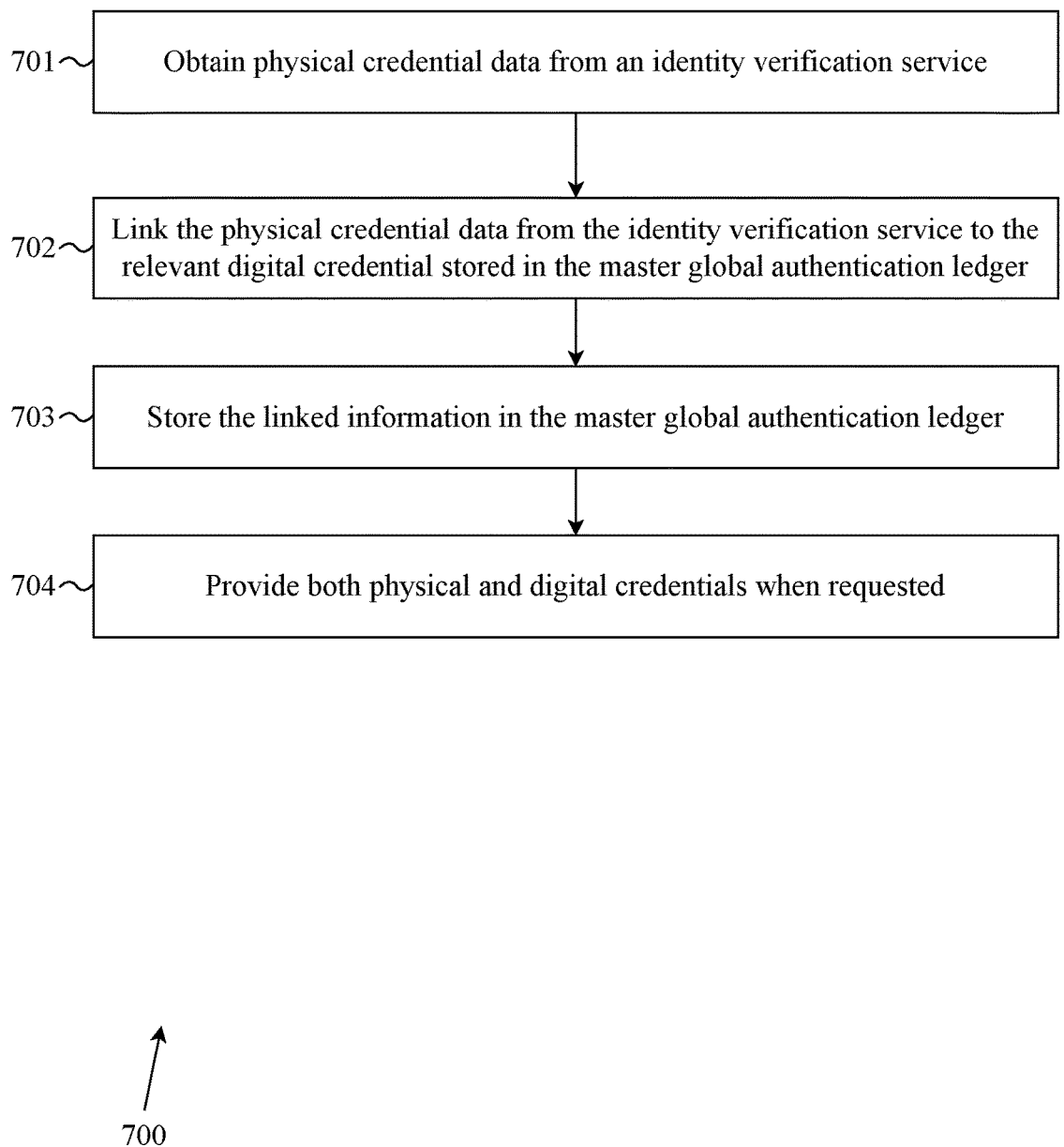
FIG. 7 is a process flow diagram illustrating an exemplary method for linking physical credential data with digital credential data, according to an embodiment.

FIG. 7 is a process flow diagram illustrating an exemplary method 700 for linking physical credential data with digital credential data, according to an embodiment. Identify verification services like SPEX or ID.me, which match a person and a set of physical identity credentials, may be integrated into CIVEXS to form a combined ledger which links both physical credential data (e.g., from identity verification services) and digital credential data (e.g., identity assertions). The combined ledger may be used in various applications where attestation of a user and the link of their digital and physical credentials is required, or would represent an improvement on existing systems and/or processes. For example, common use cases would be for real estate closing, bank account openings, powers of attorney, notarization (e.g., digital and remote notaries), health care actions/approvals, and/or the like. Furthermore, this combined ledger may be leveraged to improve money laundering and anti-terrorism elements with ACH, SWIFT, etc. networks by linking CIVEXS and physical credential audit information/metadata to the transaction in traditional databases or immutable ledgers (e.g., blockchain, etc.).

According to the embodiment, the process begins at step 701 when CIVEXS obtains physical credential data from an identity verification service. Some exemplary identify verification services which may be integrated with CIVEXS can include, but is not limited to, Jumio, ID.me, Onfido, SPEX, and/or the like. At step 702, data ingestion engine 320 can link the physical credential data from the identity verification service to the relevant digital credential stored in the master global authentication ledger. In some implementations, metadata collected by metadata manager 330 may be used to determine links between physical credentials and digital credentials. For example, metadata associated with an obtained identity assertion may be used to determine a user associated with the identity assertion. The determination of the user via metadata may then be compared against the obtained physical credential data to determine if a physical credential is associated with a digital credential. If the credentials are associated with the same user/individual, then the two different credentials may be logically linked. In some implementations, the linked credentials may be stored in the master global authentication ledger. In other implementations, two separate ledgers may be used to store the physical credential data and the digital credential data, wherein the linked data is logically associated with each other. At step 703, the linked information may be stored in the master global authentication ledger or in a separate ledger, depending upon the embodiment. At step 704. CIVEXS may provide both physical and digital credentials when requested. For example, in real estate closing it is required for the purchasers to provide physical credentials which prove their identity as well as provide a plurality of documentation, usually via a digital portal or means for uploading documents. In this example, CIVEXS can provide both the physical and digital credentials required to execute the real estate closing process.

Exemplary Computing Environment

Figure 8:
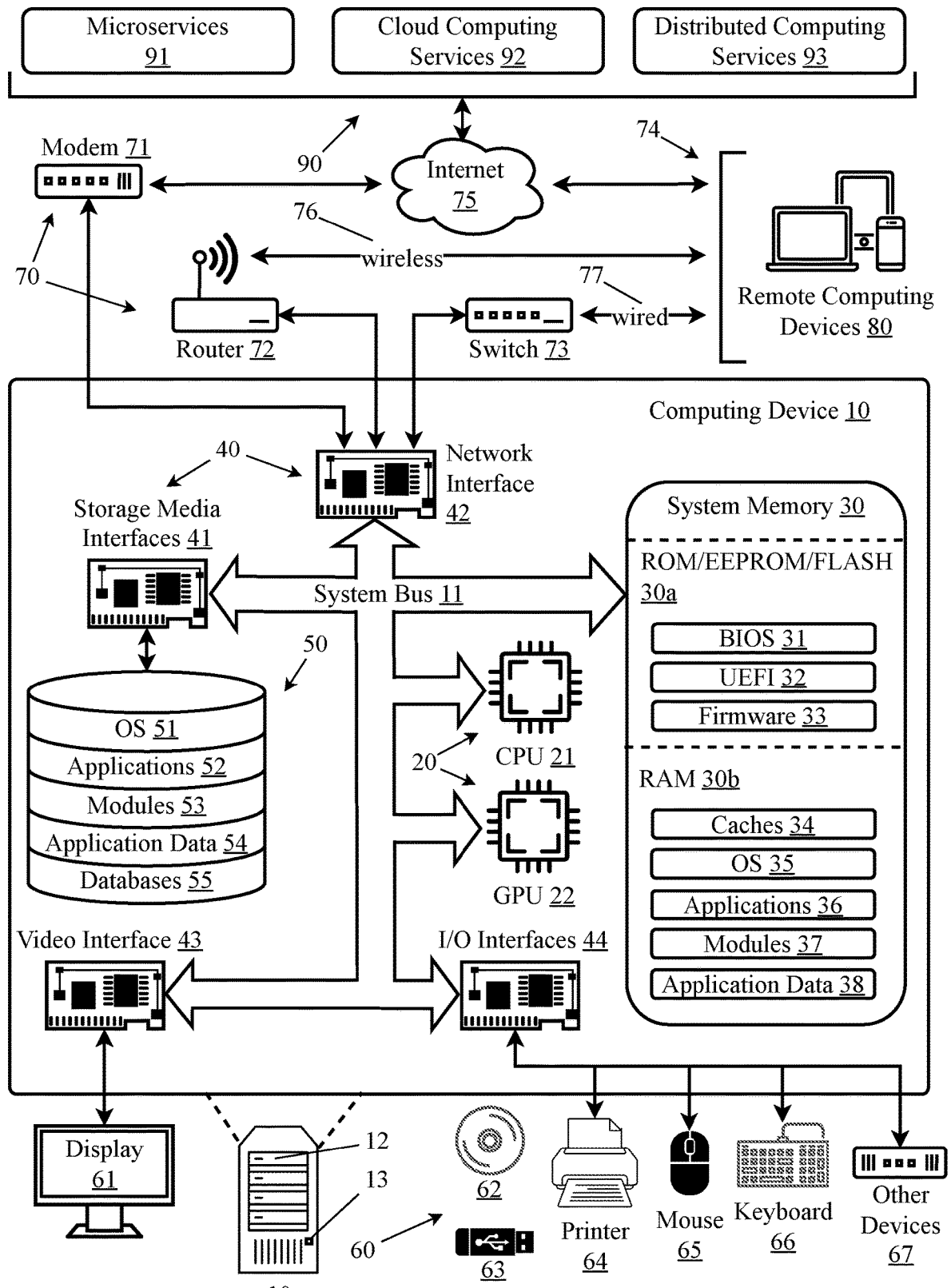
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:
1. A system for providing cloud identity verification, comprising:
   a computing device comprising a memory, a processor and a non-volatile data storage device;
   a first plurality of programming instructions stored in the memory which, when operating on the processor, causes the computing device to:
      receive a plurality of identity assertions from an identity provider;

for each identity assertion of the plurality of identity assertions:
assign an identification value to said identity assertion;
create a unique hash value associated with said identity assertion; and
store said identity assertion, the identification value assigned to said identity assertion, and the unique hash value assigned to said identity assertion in a master global authentication ledger stored on the non-volatile data storage device;
obtain credential data unique to a user from an identity verification service, wherein the unique credential data represents a verified identity of the user;
store the physical credential data to the relevant identity assertion stored in the master global authentication ledger.

2. The system of claim 1, further comprising a second plurality of programming instructions stored in the memory which, when operating on the processor, causes the computing device to:
for each identity assertion of the plurality of identity assertions:
parse said identity assertion to collect a plurality of metadata associated with said identity assertion; and
store the collected metadata in the master global authentication ledger.

3. The system of claim 2, wherein the metadata comprises information related to issuer, timestamp, audience, authentication method, subject, authentication context, authentication level or assurance, attributes, digital signatures, and security tokens.

4. The system of claim 2, wherein the identification value assigned to each identity assertion is based on a combination of attributes based on the collected metadata associated with respective identity assertion.

5. The system of claim 1, wherein the physical credential data is provided to a requesting party upon request.

6. The system of claim 5, wherein the requesting party is associated with real estate closing, bank account openings, powers of attorney, notarization, or health care actions.

7. The system of claim 1, wherein each unique the hash value is created using a cryptograph hash function.

8. The system of claim 1, wherein the identity assertions comprise at least SAML objects, OAuth tokens, and Kerberos tickets.

9. The system of claim 1, wherein the identity assertions are associated with single sign-on systems.

10. A method for providing cloud identity verification, comprising the steps of:
receiving a plurality of identity assertions from an identity provider;
for each identity assertion of the plurality of identity assertions:
assign an identification value to said identity assertion;
create a unique hash value associated with said identity assertion; and
store said identity assertion, the identification value assigned to said identity assertion, and the unique hash value assigned to said identity assertion in a master global authentication ledger stored on the non-volatile data storage device;
obtaining credential data unique to a user from an identity verification service, wherein the unique credential data represents a verified identity of the user;
storing the physical credential data to the relevant identity assertion stored in the master global authentication ledger.

11. The method of claim 10, further comprising the steps of:
for each identity assertion of the plurality of identity assertions:
parse said identity assertion to collect a plurality of metadata associated with said identity assertion; and
store the collected metadata in the master global authentication ledger.

12. The method of claim 11, wherein the metadata comprises information related to issuer, timestamp, audience, authentication method, subject, authentication context, authentication level or assurance, attributes, digital signatures, and security tokens.

13. The method of claim 11, wherein the identification value assigned to each identity assertion is based on a combination of attributes based on the collected metadata associated with respective identity assertion.

14. The method of claim 10, wherein the physical credential data is provided to a requesting party upon request.

15. The method of claim 14, wherein the requesting party is associated with real estate closing, bank account openings, powers of attorney, notarization, or health care actions.

16. The method of claim 10, wherein each unique the hash value is created using a cryptograph hash function.

17. The method of claim 10, wherein the identity assertions comprise at least SAML objects, OAuth tokens, and Kerberos tickets.

18. The method of claim 10, wherein the identity assertions are associated with single sign-on systems.

* * * * *